US012401939B2

(12) United States Patent
Ren et al.

(10) Patent No.: US 12,401,939 B2
(45) **Date of Patent: *Aug. 26, 2025**

(54) COAXIAL SPEAKER BOX

(71) Applicant: AAC Microtech (Changzhou) Co., Ltd., Changzhou (CN)

(72) Inventors: Zhang Ren, Shenzhen (CN); Zhiwei Zhong, Shenzhen (CN); Qi Wang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/913,852

(22) PCT Filed: Jul. 20, 2022

(86) PCT No.: PCT/CN2022/106755
§ 371 (c)(1),
(2) Date: Sep. 23, 2022

(87) PCT Pub. No.: WO2024/000691
PCT Pub. Date: Jan. 4, 2024

(65) Prior Publication Data

US 2025/0133331 A1 Apr. 24, 2025

(30) Foreign Application Priority Data

Jun. 30, 2022 (CN) ........................ 202221691529.9

(51) Int. Cl.
*H04R 1/24* (2006.01)
*H04R 1/28* (2006.01)
(Continued)

(52) U.S. Cl.
CPC ............. *H04R 1/24* (2013.01); *H04R 1/2857* (2013.01); *H04R 7/127* (2013.01); *H04R 9/025* (2013.01); *H04R 9/06* (2013.01); *H04R 2400/11* (2013.01)

(58) Field of Classification Search
CPC .......... H04R 3/02; H04R 1/105; H04R 9/025; H04R 1/1075; H04R 1/288; H04R 1/1008;
(Continued)

(56) References Cited

U.S. PATENT DOCUMENTS

2004/0071303 A1* 4/2004 Furuya .................. H04M 1/035 379/433.02
2015/0139479 A1* 5/2015 Lai ......................... H04R 9/025 381/412
(Continued)

FOREIGN PATENT DOCUMENTS

CN 201781608 U * 3/2011

*Primary Examiner* — Carolyn R Edwards
*Assistant Examiner* — Julie X Dang
(74) *Attorney, Agent, or Firm* — Wiersch Law Group

(57) ABSTRACT

A coaxial speaker box includes a housing, a speaker, and a sound guide channel for guiding sound outside. The speaker includes a frame, a magnetic circuit system, a first vibration system, and a second vibration system. The first vibration system is disposed in the frame. The second vibration system is disposed on an outer side of the frame. A front cavity is formed among the first vibration system, the second vibration system, and the housing. The first vibration system includes a first vibrating diaphragm and a first voice coil. A coaxial full-band speaker is formed by the bass and the high pitch of the coaxial speaker box to provide high-quality sound effects. The high pitch and the bass share a side sound guide channel, and form a front cavity resonance in a bass channel to improve high-frequency sound effects.

9 Claims, 5 Drawing Sheets

(51) Int. Cl.
*H04R 7/12* (2006.01)
*H04R 9/02* (2006.01)
*H04R 9/06* (2006.01)

(58) Field of Classification Search
CPC ........ H04R 1/1066; H04R 1/08; H04R 9/063; H04R 5/033; H04R 2201/107; H04R 2460/13; H04R 1/227; H04R 9/10; H04R 1/24; H04R 2209/026; H04R 2400/01; H04R 2499/11
USPC .................................................. 381/400–412
See application file for complete search history.

(56) References Cited

U.S. PATENT DOCUMENTS

2016/0212521 A1* 7/2016 Huang ..................... H04R 1/24
2020/0213741 A1* 7/2020 Shen ...................... H04R 1/345
2023/0269539 A1* 8/2023 Zhang .................... H04R 9/063
381/400
2023/0292037 A1* 9/2023 Xu ........................... H04R 1/24
2025/0133343 A1* 4/2025 Ren .......................... H04R 9/02

* cited by examiner

COAXIAL SPEAKER BOX

TECHNICAL FIELD

The present disclosure relates to a field of sensors, and in particular to a coaxial speaker box.

BACKGROUND

Coaxial speakers refer to speakers each integrated with a tweeter speaker and a woofer speaker, where the tweeter speaker and the woofer speaker are coaxially disposed. A sound source of the tweeter speaker of the coaxial speakers and a sound source of the woofer speaker of the coaxial speakers are disposed on a front surface of coaxial speaker boxes. That is, sound production directions of the tweeter speaker and the woofer speaker are the same. In addition, the tweeter speaker and the woofer speaker may be further respectively disposed on the front surface and a back surface of the coaxial speaker box. That is, the sound production directions of the tweeter speaker and the woofer speaker are different. Each of the coaxial speakers is assembled into a housing to form a coaxial speaker box.

The tweeter speaker and the woofer speaker of the coaxial speakers in related art respectively include a separated vibration system and a separated magnetic circuit system, which is complex in structure. A whole height of the coaxial speakers and the coaxial speaker boxes are increased, where the coaxial speakers are composed of the tweeter speaker and the woofer speaker, so that inconvenience of installation is resulted and applicability of products is reduced. In addition, a separated high pitch magnetic circuit and a separated bass magnetic circuit further increase production costs, which reduces market competitiveness of the products. What's more, in related art, an effective area of a vibrating diaphragm in a speaker, distal from a sound surface, is limited, which cannot meet requirements of full-sound range. Meanwhile, a sound production direction of the coaxial speaker boxes having the coaxial speakers is generally at top, so that resonance energy of a front cavity is low and high pitch sound effect is poor.

Therefore, it is necessary to provide a new coaxial speaker box to solve above technical problems.

SUMMARY

The present disclosure aims to provide a full-band coaxial speaker box with good high pitch and bass sound effects.

In order to achieve above purpose, the present disclosure provides the coaxial speaker box, including a housing, a speaker, and a sound guide channel. The speaker is accommodated in the housing. The sound guide channel is configured to guide sound emitted by the speaker from a side surface of the housing to an outside of the housing. The speaker includes a frame, a magnetic circuit system, a first vibration system, and a second vibration system. The magnetic circuit system is fixed below the frame. The first vibration system is fixed to an inner side of the frame. The second vibration system is fixed to an outer side of the frame. The second vibration system is disposed around the first vibration system. The first vibration system and the second vibration system are coaxially disposed. A front cavity is formed among the first vibration system, the second vibration system, and the housing. The first vibration system includes a first vibrating diaphragm and a first voice coil. The first voice coil is configured to drive the first vibrating diaphragm to vibrate and generate sound. The second vibration system includes a second vibrating diaphragm and a second voice coil. The second voice coil is configured to drive the second vibrating diaphragm to vibrate and generate sound. The magnetic circuit system includes a first magnetic gap and a second magnetic gap. The second magnetic gap is formed on an outer side of the first magnetic gap. The first voice coil is at least partially inserted into the first magnetic gap. The second voice coil is at least partially inserted into the second magnetic gap. The first vibrating diaphragm is for high-pitch sounding. The high pitch emitted by the first vibrating diaphragm penetrates through the frame and is transmitted to an outside of the housing from the sound guide channel. The second diaphragm is for bass sounding. The bass emitted by the second vibrating diaphragm is transmitted to the outside of the housing from the sound guide channel.

Furthermore, the frame is of an annular structure. The frame includes an upper wall surface, a lower wall surface, an inner wall surface, and an outer wall surface. The upper wall surface abuts against the housing. The lower wall surface is fixed on the magnetic circuit system. The inner wall surface is connected to the upper wall surface and the lower wall surface. The frame is recessed from the upper wall surface towards the lower wall surface to form a first sound transmission hole. The first sound transmission hole does not penetrate to the lower wall surface.

Furthermore, a length of the sound guide channel is greater than a length of the first sound transmission hole of the frame.

Furthermore, the speaker further includes an insert and a first circuit board. The insert is disposed around the magnetic circuit system. The first circuit board is fixed with the insert. The insert includes a first terminal. The first terminal penetrates through the insert. The first voice coil is electrically connected to the first circuit board through the first terminal.

Furthermore, the speaker further includes a supporting frame and an elastic assembly. The elastic assembly is connected to the second vibration system and the supporting frame. The elastic assembly includes a second circuit board and a supporting vibrating diaphragm. The supporting vibrating diaphragm is connected to the second circuit board. The second voice coil is electrically connected to the second circuit board.

Furthermore, the magnetic circuit system includes a magnetic bowl. The magnetic bowl includes a side portion and a bottom portion. The side portion is enclosed to form a containing space. The bottom portion is formed by bending and extending from one end of the side portion. The magnetic circuit system further includes a first magnet assembly and a second magnet assembly. The first magnet assembly is disposed on a first side of the magnetic bowl. The second magnet assembly is disposed on a second side of the magnetic bowl. The first magnet assembly includes a first magnet. The first magnetic gap is formed between the first magnet and a side wall of the magnetic bowl. The second magnet assembly includes a second magnet and a third magnetic steel. The third magnetic steel is disposed on an outer side of the second magnet. The third magnetic steel and the second magnet form the second magnetic gap.

Furthermore, the first vibrating diaphragm includes a first dome and a first folding ring. The first folding ring surrounds the first dome. The first folding ring includes a first fixing portion. The first fixing portion is attached and fixed to the inner wall surface of the frame.

Furthermore, a second sound transmission hole is defined in a position, with respect to the first sound transmission hole of the frame, of the first fixing portion.

Furthermore, parts of the first fixing portion forming the second sound transmission hole are attached and fixed to a bottom wall of the frame, where the first sound transmission hole is defined on the bottom wall of the frame.

Furthermore, the first magnet assembly includes a pole core. The pole core is disposed on the first magnet. The first fixing portion is partially clamped between an inner wall surface of the frame and the pole core.

Compared with prior art, the coaxial speaker box of the present disclosure includes: the housing, the speaker, and the sound guide channel. The speaker is accommodated in the housing. The sound guide channel is configured to guide sound emitted by the speaker from the side surface of the housing to the outside of the housing. The speaker includes the frame, the magnetic circuit system, the first vibration system, and the second vibration system. The magnetic circuit system is fixed below the frame. The first vibration system is fixed to the inner side of the frame. The second vibration system is fixed to the outer side of the frame. The second vibration system is disposed around the first vibration system. The first vibration system and the second vibration system are coaxially disposed. The front cavity is formed among the first vibration system, the second vibration system, and the housing. The first vibration system includes the first vibrating diaphragm and the first voice coil. The first voice coil is configured to drive the first vibrating diaphragm to vibrate and generate sound. The second vibration system includes the second vibrating diaphragm and the second voice coil. The second voice coil is configured to drive the second vibrating diaphragm to vibrate and generate sound. The magnetic circuit system includes the first magnetic gap and the second magnetic gap. The second magnetic gap is formed on an outer side of the first magnetic gap. The first voice coil is at least partially inserted into the first magnetic gap. The second voice coil is at least partially inserted into the second magnetic gap. The first vibrating diaphragm is for high-pitch sounding. The high pitch emitted by the first vibrating diaphragm penetrates through the frame and is transmitted to an outside of the housing from the sound guide channel. The second diaphragm is for bass sounding. The bass emitted by the second vibrating diaphragm is transmitted to the outside of the housing from the sound guide channel. The coaxial speaker box of the present disclosure provides an annular bass vibration system to provide bass sound effects. A high pitch vibration system is disposed on an inner side of the bass vibration system to provide high pitch sound effects. A coaxial full-band speaker is formed by bass and high pitch to provide high-quality sound effects for the coaxial speaker box. The high pitch and the bass share a side sound guide channel, and form a front cavity resonance in a bass channel to improve high-frequency sound effects. high pitch airflow emits sound from one side of the frame, which improves directivity of the coaxial speaker box.

BRIEF DESCRIPTION OF DRAWINGS

In order to more clearly illustrate technical solutions in embodiments of the present disclosure, drawings required in description of the embodiments are briefly described below. Obviously, the drawings in the following description are merely some embodiments of the present disclosure. For a person of ordinary skill in art, other drawings may be obtained according to the drawings without creative efforts.

DETAILED DESCRIPTION OF EMBODIMENTS

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Referring to FIGS. 1-7, the present disclosure provides a coaxial speaker box 200, including a housing 300, a speaker 100, and a sound guide channel 400. The speaker 100 is accommodated in the housing 300. The sound guide channel 400 is configured to guide sound emitted by the speaker 100 from a side surface of the housing 300 to an outside of the housing 300.

Figure 1:
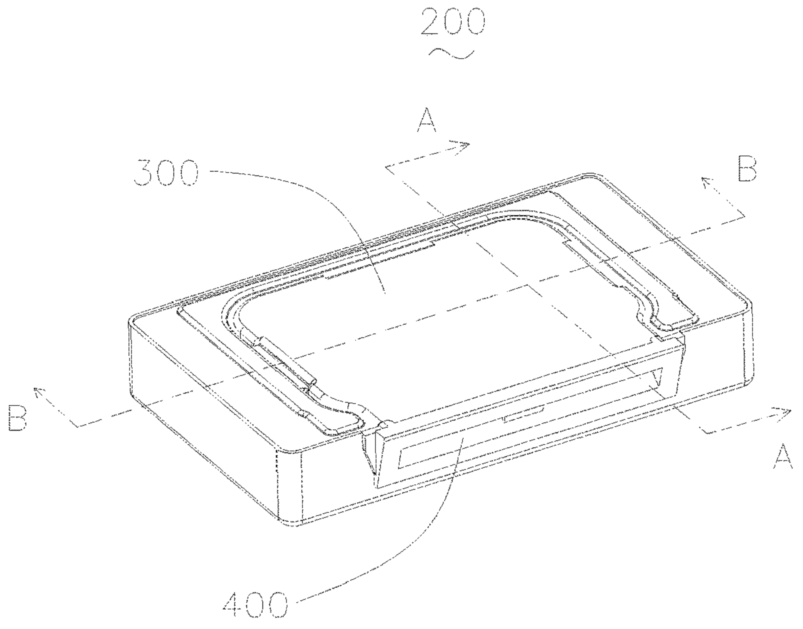
FIG. 1 is a three-dimensional structural schematic diagram of a coaxial speaker box according to one embodiment of the present disclosure.
Figure 2:
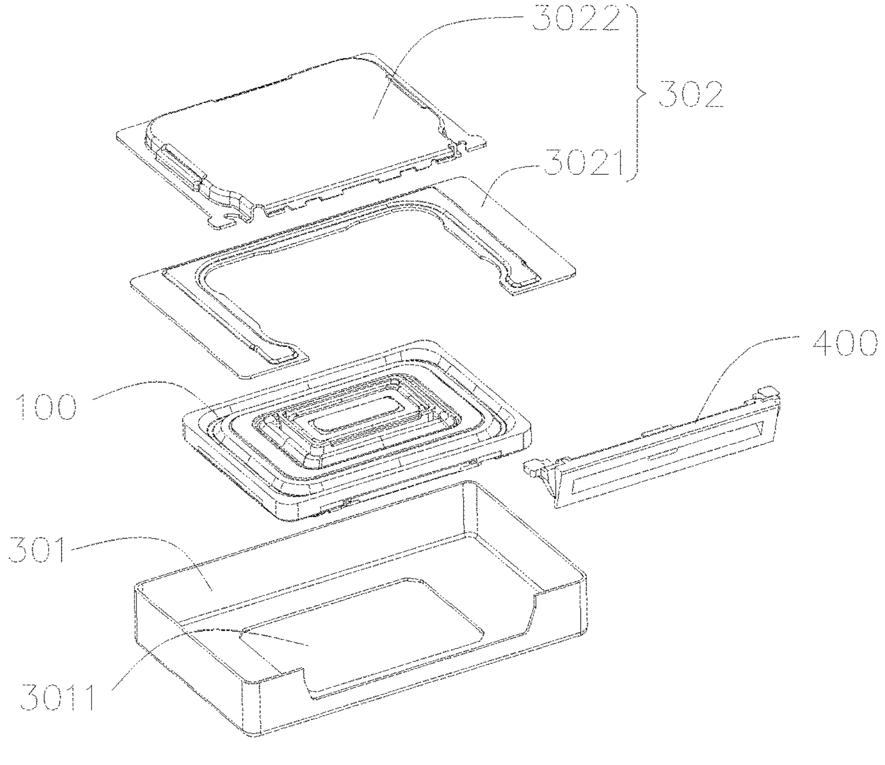
FIG. 2 is a partially exploded schematic diagram of the coaxial speaker box as shown in FIG. 1.
Figure 3:
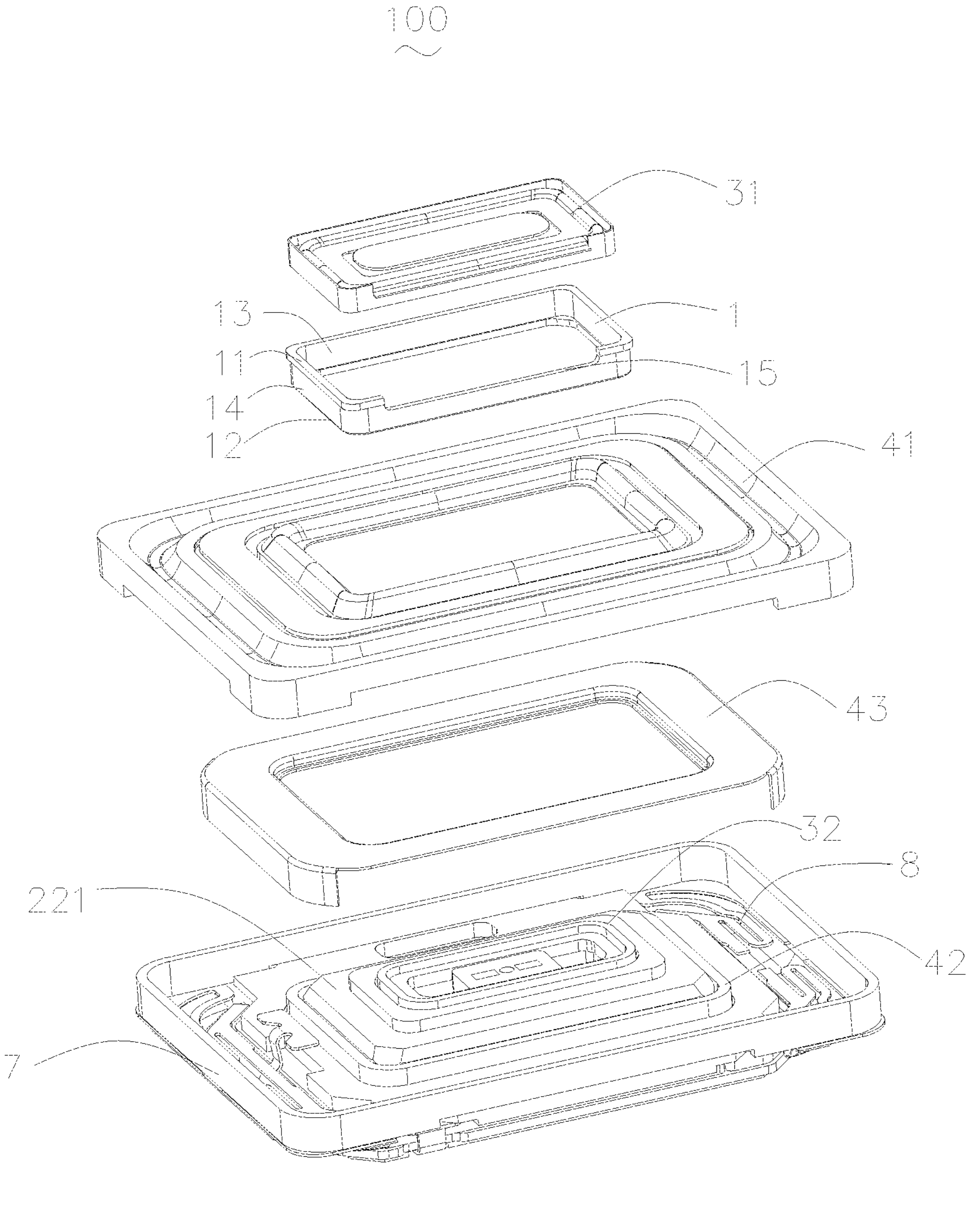
FIG. 3 is a schematic diagram of a partially exploded view of a speaker in the coaxial speaker box as shown in FIG. 1.
Figure 4:
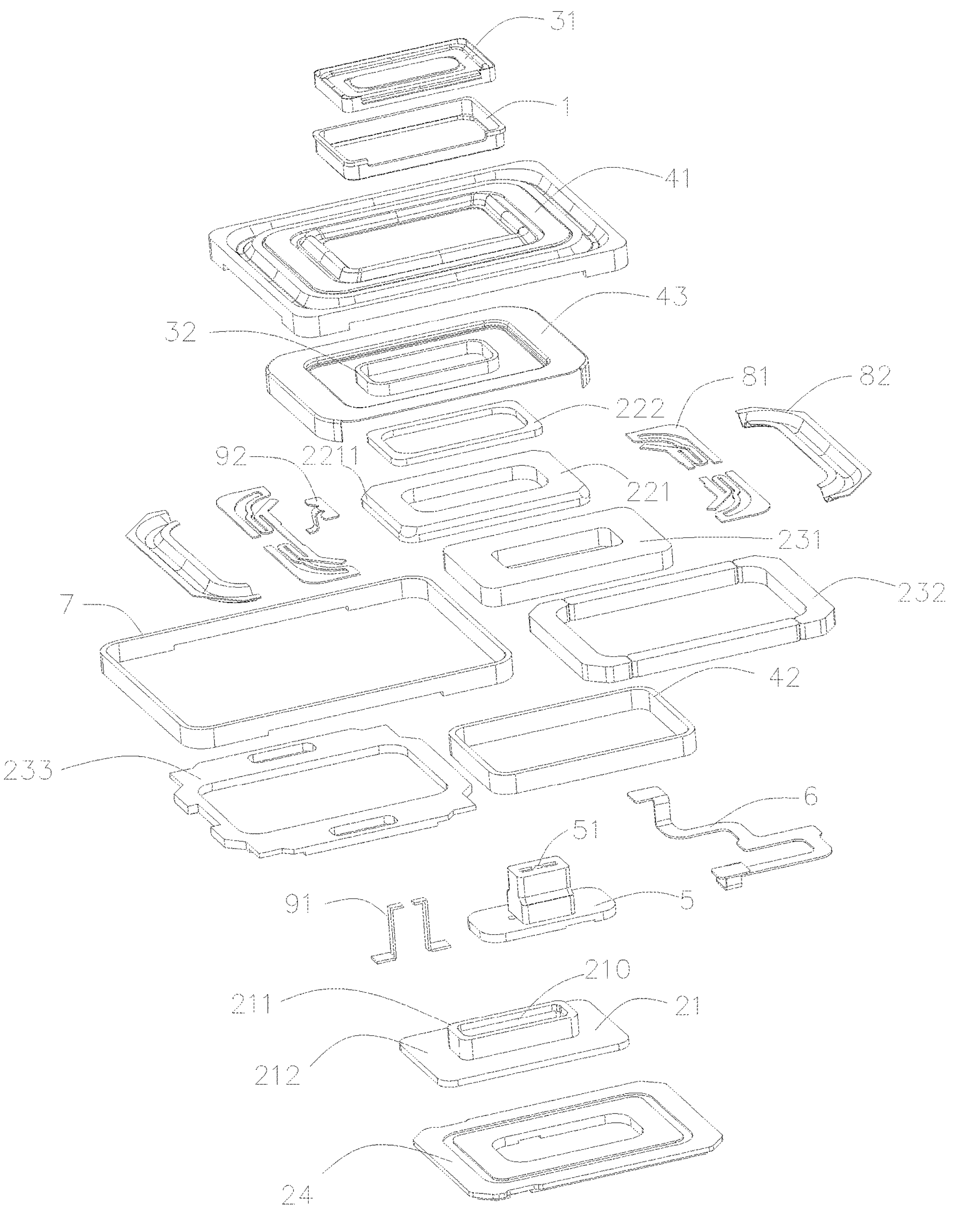
FIG. 4 is a schematic diagram of another partially exploded view of the speaker in the coaxial speaker box as shown in FIG. 1.
Figure 5:
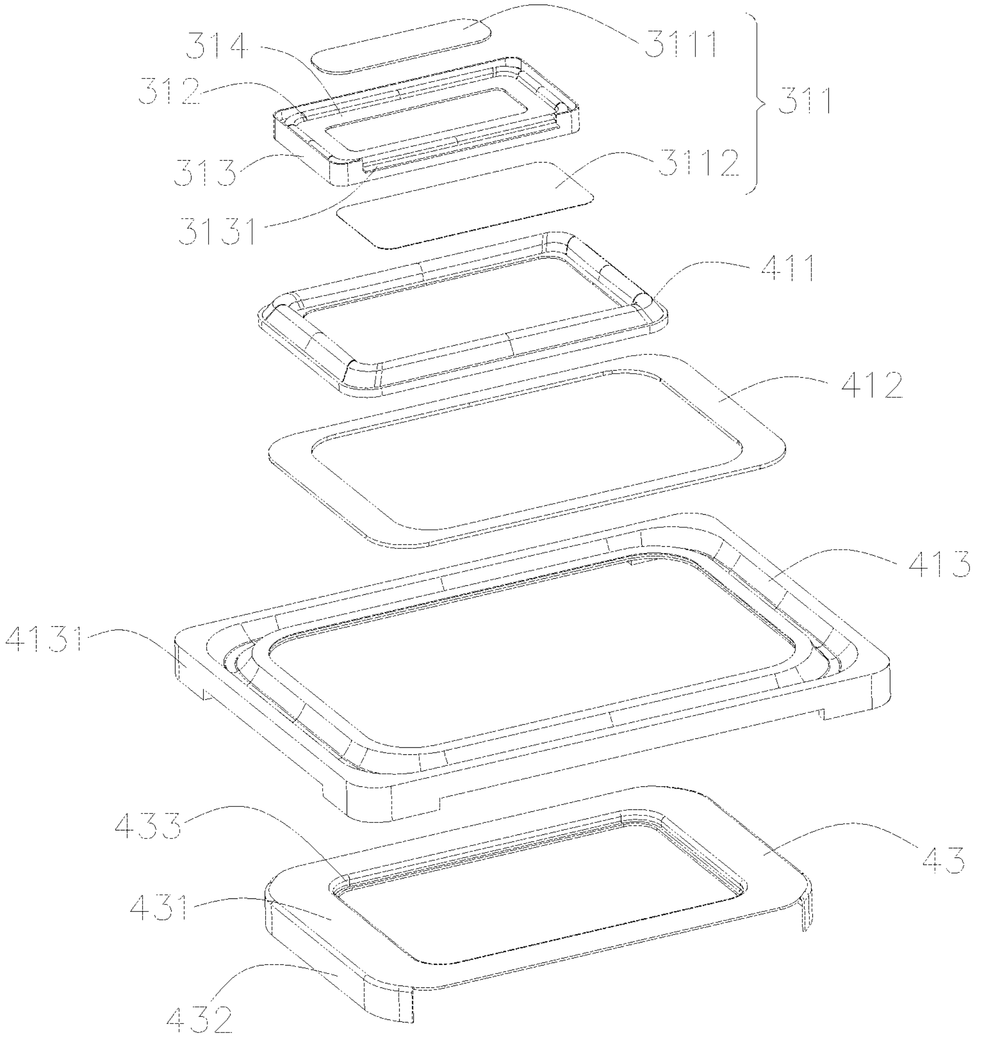
FIG. 5 is a schematic diagram of an exploded view of partially components of the speaker in the coaxial speaker box as shown in FIG. 1.
Figure 6:
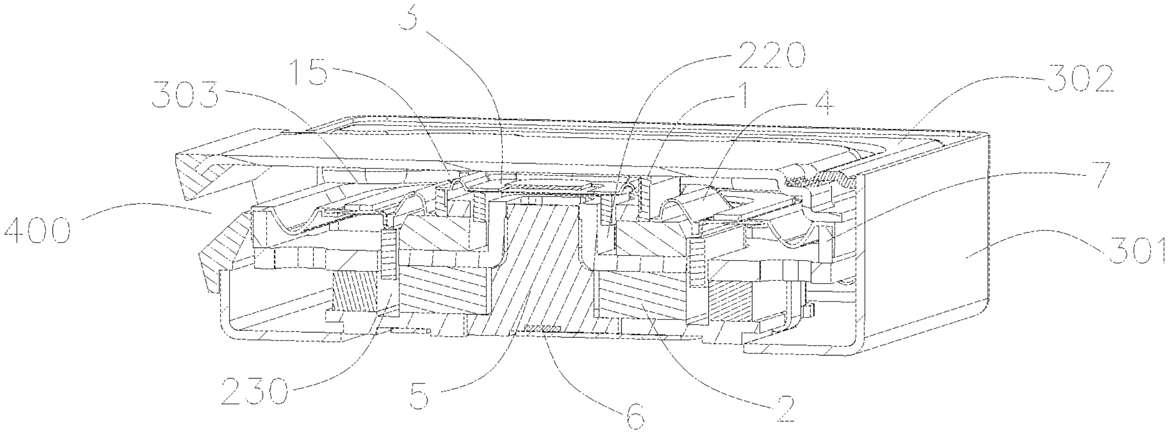
FIG. 6 is a cross-sectional schematic diagram taken along the line A-A shown in FIG. 1.
Figure 7:
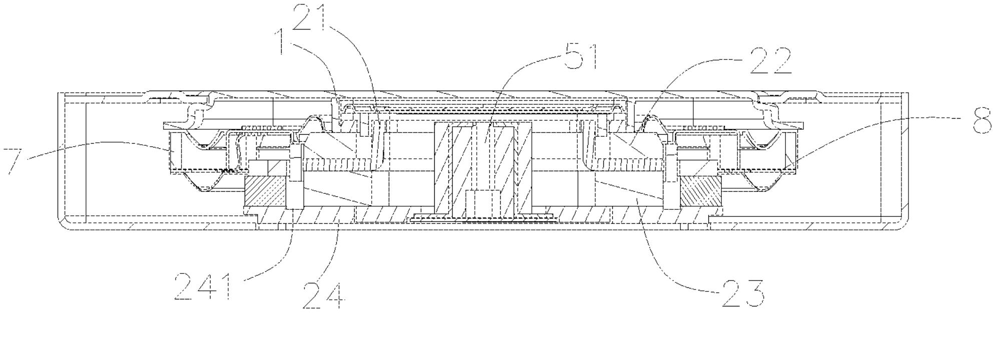
FIG. 7 is a cross-sectional schematic diagram taken along the line B-B shown in FIG. 1.

As shown in FIG. 2, the housing 300 includes a lower housing 301 and an upper housing 302. The upper housing 302 covers the lower housing 301. A through hole 3011 is defined in a bottom wall of the lower housing 301. The upper housing 302 includes a frame 3021 and a steel sheet 3022. The steel sheet 3022 is embedded and fixed to the frame 3021.

As shown in FIGS. 3-7, the speaker 100 includes a frame 1, a magnetic circuit system 2, a first vibration system 3, a second vibration system 4, an insert 5, a first circuit board 6, a supporting frame 7, and an elastic assembly 8. The magnetic circuit system 2 is fixed on the frame 1. The first vibration system 3 is fixed on an inner side of the frame 1. The second vibration system 4 is fixed on an outer side of the frame 1. The first circuit board 6 is fixed on the insert 5. The second vibration system 4 surrounds an outer side of the first vibration system 3. The first vibration system 3 and the second vibration system 4 are coaxially disposed.

A periphery of the frame 1 is roughly rectangular. The frame 1 includes an upper wall surface 11, a lower wall surface 12, an inner wall surface 13, and an outer wall surface 14. The upper wall surface 11 abuts against the housing 300. The lower wall surface 12 is fixed on the magnetic circuit system 2. The inner wall surface 13 is connected to the upper wall surface 11 and the lower wall surface 12. Specifically, the upper wall surface 11 abuts against and is fixed with the steel sheet 3022. The frame 1 is recessed from the upper wall surface 11 towards the lower wall surface 12 to form a first sound transmission hole 15. The first sound transmission hole 15 penetrates through the inner wall surface 13 and the outer wall surface 14, and does not penetrate to the lower wall surface 12. The first vibration system 3 is disposed on one side of the inner wall surface 13 of the frame 1. The second vibration system 4 is disposed on one side of the outer wall surface 14 of the frame 1. A length of the first sound transmission hole 15 of the frame 1 is smaller than a length of the sound guide channel 400.

The magnetic circuit system 2 includes a magnetic bowl 21, a first magnet assembly 22, and a second magnet assembly 23. The first magnet assembly 22 is disposed on a first side of the magnetic bowl 21. The second magnet assembly 23 is disposed on a second side of the magnetic bowl 21. The first magnet assembly 22 and the second magnet assembly 23 are coaxially disposed. The magnetic bowl 21 includes a side portion 211 and a bottom portion 212. The side portion 211 is enclosed to form a containing space 210. The bottom portion 212 is formed by bending and extending from one end of the side portion 211. The first magnet assembly 22 includes a first magnet 221 and a pole core 222. The pole core 222 is disposed on the first magnet 221. A first magnetic gap 220 is defined between the first magnet 221 and the side portion 211 of the magnetic bowl 21. A tangent plane 2211 is defined on an outer edge of a surface, close to the second vibration system 4, of the first magnet 221. The bottom portion 212 of the magnetic bowl 21 carries the first magnet 221. The second magnet assembly 23 includes a second magnet 231, a third magnetic steel 232, and a magnetic conductive plate 233. The third magnetic steel 232 and the second magnet 231 form a second magnetic gap 230. The magnetic conductive plate 233 is stacked above the third magnetic steel 232. The bottom portion 212 of the magnetic bowl 21 is stacked above the second magnet 231. The first magnet 221 and the second magnet 232 are oppositely disposed. The magnetic circuit system 2 further includes a yoke 24 and the third magnetic steel 232. The yoke 24 carries the second magnet 231. The yoke 24 is partially exposed through a through hole 3011 of the lower housing 301. A lower surface of the yoke 24 is flush with a lower surface of the insert 5.

The first magnet 221, the second magnet 231, and the third magnetic steel 232 are magnetized in vibration direction of the speaker 100. The first magnet 221 and the second magnet 231 are disposed opposite to each other in the same pole. That is, magnetizing directions of the first magnet 221 and the second magnet 231 are opposite. The second magnet 231 and the third magnetic steel 232 are opposite in magnetizing direction. In the embodiment, the first magnet 221, the pole core 222, the second magnet 231, the third magnetic steel 232, and the magnetic conductive plate 233 are all hollow annular structures.

The first vibration system 3 includes a first vibrating diaphragm 31 and a first voice coil 32. The first voice coil 32 is configured to drive the first vibrating diaphragm 31 to vibrate and generate sound. The first voice coil 32 is at least partially inserted into the first magnetic gap 220. The first vibrating diaphragm 31 is for high-pitch sounding, and a sounding direction of the first vibrating diaphragm 31 is upward along the vibration direction. The first vibrating diaphragm 31 includes a first dome 311 and a first folding ring 312. The first folding ring 312 surrounds the first dome 311. The first dome 311 includes a first dome portion 3111 and a second dome portion 3112. The first dome portion 3111 is disposed above the first folding ring 312. The second dome portion 3112 is disposed below the first folding ring 312. The first folding ring 312 is of a hollow annular structure. The first folding ring 312 is of a structure protruding upwards in the vibration direction. A size of the first dome portion 3111 is smaller than a size of the second dome portion 3112. The first dome portion 3111 is attached and fixed to the second dome portion 3112. The second dome portion 3112 is fixed on the first folding ring 312. A first fixing portion 313 is disposed on an outer edge of the first folding ring 312. A second fixing portion 314 is disposed on an inner edge of the first folding ring 312. The first fixing portion 313 is attached and fixed to an inner side wall 11 of the frame 1. The second dome portion 3112 is attached to the second fixing portion 314. The second dome portion 3112 is clamped between the second fixing portion 314 and the first voice coil 32. Furthermore, the first fixing portion 313 is partially clamped between the frame 1 and the pole core 222. A second sound transmission hole 3131 is defined in a position, with respect to the first sound transmission hole 15 of the frame 1, of the first fixing portion 313. Parts of the first fixing portion 313 forming the second sound transmission hole 3131 are attached and fixed to a bottom wall of the frame 1, where the first sound transmission hole 15 is defined on the bottom wall of the frame 1.

The second vibration system 4 includes a second vibrating diaphragm 41, a second voice coil 42, and a voice coil framework 43. The second voice coil 42 is configured to drive the second vibrating diaphragm 41 to vibrate and generate sound. The voice coil framework 43 is connected to the second vibrating diaphragm 41 and the second voice coil 42. The second voice coil 42 is at least partially inserted into the second magnetic gap 230. The second diaphragm 41 is for bass sounding, and a sounding direction of the second diaphragm 41 is upward along the vibration direction. The second vibrating diaphragm 41 includes a second folding ring 411, a second dome 412, and a third folding ring 413. The second dome 412 is disposed around the second folding ring 411. The third folding ring 413 is disposed around the second dome 412. The second folding ring 411, the second dome 412, and the third folding ring 413 are all hollow annular structures. The second folding ring 411 is of a structure protruding upwards in the vibration direction. The third folding ring 413 is of a structure which is sunken downwards in the vibration direction. The voice coil framework 43 is connected to the second folding ring 411, the second dome 412, the third folding ring 413, and the second voice coil 42. An end, close to the first vibrating diaphragm 31, of the second folding ring 411 is fixed on the outer wall surface 14 or/and the first magnet 221 of the frame 1. An outer edge of the third folding ring 413 includes a third fixing portion 4131.

A front cavity 303 is formed among the first vibration system 3, the second vibration system 4, and the upper housing 302 of the housing 300. A portion of the front cavity, with respect to the first vibration system 3, is communicated with a portion of the front cavity, with respect to the second vibration system 4, through the first sound transmission hole 15 and the second sound transmission hole 3131. Due to a fact that a length of the sound guide channel 400 is larger than a length of the first sound transmission hole 15 of the frame 1, a high pitch portion forms a horn shape along a gradual diffusion direction to be emitted to an outer side of the housing 300, which improves directivity of the coaxial speaker box 200, and improves resonance energy of the front cavity 303.

A receding recess portion 241 is disposed on a position, with respect to the second voice coil 42, of the yoke 24, so as to provide a sufficient vibration space for the second voice coil 42.

The insert 5 is disposed in a containing space 210 defined by the side portion 211 of the magnetic bowl 21. The first circuit board 6 is attached to an outer surface of the yoke 24. The insert 5 includes a first terminal 91. The first terminal 91 penetrates through the insert 5. The first terminal 91 is connected to the first circuit board 6. The first voice coil 32 is electrically connected to the first circuit board 6 through the first terminal 91. The insert 5 includes a leakage channel 51. The leakage channel 51 penetrates through the insert 5.

The supporting frame 7 is an annular steel ring. The third fixing portion 4131 of the third folding ring 413 is fixedly connected to the supporting frame 7. Specifically, the third fixing portion 4131 covers an upper surface of the supporting frame 7 and part of an outer side surface of the supporting frame 7. The pole core 222 is fixed at one end, distal from the second vibrating diaphragm 41, of the supporting frame 7.

The elastic assembly 8 is connected to the voice coil framework 43 and the supporting frame 7. The elastic assembly 8 includes a second circuit board 81 and a supporting vibrating diaphragm 82. The supporting vibrating diaphragm 82 is connected to the second circuit board 81. The second voice coil 42 is electrically connected to the second circuit board 81. Specifically, the speaker 100 further includes a second terminal 92. The second terminal 92 is connected to the second circuit board 81. The second voice coil 42 is electrically connected to the second circuit board 81 through the second terminal 92. In the embodiment, the number of the elastic assemblies 8 is two, the elastic assemblies are disposed in a short-axis direction of the speaker 100, and the elastic assemblies are determined according to visual conditions in other embodiments.

The voice coil framework 43 includes a framework flat plate portion 431, a first extension portion 432, and a second extension portion 433. The framework flat plate portion 431 is attached to the second dome 412. The first extension portion 432 is bent and extending from a first end of the framework flat plate portion 431 towards the second circuit board 81. The first extension portion 432 is connected to the second circuit board 81. The second extension portion 433 is bent and extending from a second end of the framework flat plate portion 431 towards the second voice coil 42. The second extension portion 433 is connected to the second voice coil 42.

Compared with prior art, the coaxial speaker box of the present disclosure includes: the housing, the speaker, and the sound guide channel. The speaker is accommodated in the housing. The sound guide channel is configured to guide sound emitted by the speaker from the side surface of the housing to the outside of the housing. The speaker includes the frame, the magnetic circuit system, the first vibration system, and the second vibration system. The magnetic circuit system is fixed below the frame. The first vibration system is fixed to the inner side of the frame. The second vibration system is fixed to the outer side of the frame. The second vibration system is disposed around the first vibration system. The first vibration system and the second vibration system are coaxially disposed. The first vibration system includes the first vibrating diaphragm and the first voice coil. The first voice coil is configured to drive the first vibrating diaphragm to vibrate and generate sound. The second vibration system includes the second vibrating diaphragm and the second voice coil. The second voice coil is configured to drive the second vibrating diaphragm to vibrate and generate sound. The magnetic circuit system includes the first magnetic gap and the second magnetic gap. The second magnetic gap is formed on an outer side of the first magnetic gap. The first voice coil is at least partially inserted into the first magnetic gap. The second voice coil is at least partially inserted into the second magnetic gap. The first vibrating diaphragm is for high-pitch sounding. The high pitch emitted by the first vibrating diaphragm penetrates through the frame and is transmitted to an outside of the housing from the sound guide channel. The second diaphragm is for bass sounding. The bass emitted by the second vibrating diaphragm is transmitted to the outside of the housing from the sound guide channel. The coaxial speaker box of the present disclosure provides an annular bass vibration system to provide bass sound effects. A high pitch vibration system is disposed on an inner side of the bass vibration system to provide high pitch sound effects. A coaxial full-band speaker is formed by bass and high pitch to provide high-quality sound effects for the coaxial speaker box. The high pitch and the bass share a side sound guide channel, and form a front cavity resonance in a bass channel to improve high-frequency sound effects. High pitch airflow emits sound from one side of the frame, which improves directivity of the coaxial speaker box.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A coaxial speaker box, comprising:

a housing;

a speaker; and a sound guide channel;

wherein the speaker is accommodated in the housing, the sound guide channel is configured to guide sound emitted by the speaker from a side surface of the housing towards an outside of the housing; the speaker comprises a frame, a magnetic circuit system, a first vibration system, and a second vibration system; the magnetic circuit system is fixed below the frame, the first vibration system is fixed to an inner side of the frame, the second vibration system is fixed to an outer side of the frame, the second vibration system is disposed around the first vibration system; the first vibration system and the second vibration system are coaxially disposed, a front cavity is formed among the first vibration system, the second vibration system, and the housing; the first vibration system comprises a first vibrating diaphragm and a first voice coil, the first voice coil is configured to drive the first vibrating diaphragm to vibrate and generate sound; the second vibration system comprises a second vibrating diaphragm and a second voice coil, the second voice coil is configured to drive the second vibrating diaphragm to vibrate and generate sound; the magnetic circuit system comprises a first magnetic gap and a second magnetic gap, the second magnetic gap is formed on an outer side of the first magnetic gap; the first voice coil is at least partially inserted into the first magnetic gap, the second voice coil is at least partially inserted into the second magnetic gap, the first vibrating diaphragm is for high-pitch sounding, the high pitch emitted by the first vibrating diaphragm penetrates through the frame and is transmitted to an outside of the housing from the sound guide channel; the second diaphragm is for bass sounding, and the bass emitted by the second vibrating diaphragm is transmitted to the outside of the housing from the sound guide channel;

the speaker further comprises an insert and a first circuit board, the insert is surrounded by the magnetic circuit system, the first circuit board is fixed with the insert, the insert comprises a first terminal, the first terminal penetrates through the insert, and the first voice coil is electrically connected to the first circuit board through the first terminal.

2. The coaxial speaker box according to claim 1, wherein the frame is of an annular structure, the frame comprises an upper wall surface, a lower wall surface, an inner wall surface, and an outer wall surface; the upper wall surface abuts against the housing, the lower wall surface is fixed on the magnetic circuit system, the inner wall surface is connected to the upper wall surface and the lower wall surface, the frame is recessed from the upper wall surface towards the lower wall surface to form a first sound transmission hole, and the first sound transmission hole does not penetrate to the lower wall surface.

3. The coaxial speaker box according to claim 2, wherein a length of the sound guide channel is greater than a length of the first sound transmission hole of the frame.

4. The coaxial speaker box according to claim 1, wherein the speaker further comprises a supporting frame and an elastic assembly, the elastic assembly is connected to the second vibration system and the supporting frame, the elastic assembly comprises a second circuit board and a supporting vibrating diaphragm, the supporting vibrating diaphragm is connected to the second circuit board, and the second voice coil is electrically connected to the second circuit board.

5. The coaxial speaker box according to claim 4, wherein the magnetic circuit system comprises a magnetic bowl, the magnetic bowl comprises a side portion and a bottom portion, the side portion is enclosed to form a containing space, the bottom portion is formed by bending and extending from one end of the side portion; the magnetic circuit system further comprises a first magnet assembly and a second magnet assembly, the first magnet assembly is disposed on a first side of the magnetic bowl, the second magnet assembly is disposed on a second side of the magnetic bowl, the first magnet assembly comprises a first magnet, the first magnetic gap is formed between the first magnet and a side wall of the magnetic bowl, the second magnet assembly comprises a second magnet and a third magnetic steel, the third magnetic steel is disposed on an outer side of the second magnet, and the third magnetic steel and the second magnet form the second magnetic gap.

6. The coaxial speaker box according to claim 5, wherein the first vibrating diaphragm comprises a first dome and a first folding ring, the first folding ring surrounds the first dome, the first folding ring comprises a first fixing portion, and the first fixing portion is attached and fixed to the inner wall surface of the frame.

7. The coaxial speaker box according to claim 6, wherein a second sound transmission hole is defined in a position, with respect to the first sound transmission hole of the frame, of the first fixing portion.

8. The coaxial speaker box according to claim 7, wherein parts of the first fixing portion forming the second sound transmission hole are attached and fixed to a bottom wall of the frame, where the first sound transmission hole is defined on the bottom wall of the frame.

9. The coaxial speaker box according to claim 6, wherein the first magnet assembly comprises a pole core, the pole core is disposed on the first magnet, the first fixing portion is partially clamped between an inner wall surface of the frame and the pole core.

* * * * *